United States Patent [19]
Lingg et al.

[11] 3,735,853
[45] May 29, 1973

[54] SYSTEM FOR DISTRIBUTING PIECES OF LOAD SUCH AS BAGGAGE, PARCELS ETC.

[75] Inventors: Gerhard Lingg; Norbert Gottstein; Joachim Rostock, all of 6906 Leimen, Germany

[73] Assignee: Mannesmann Aktiengesellschaft, Dusseldorf, Germany

[22] Filed: Mar. 1, 1972

[21] Appl. No.: 230,612

[52] U.S. Cl....................................198/20, 198/38
[51] Int. Cl..............................................B65g 47/04
[58] Field of Search....................198/20 R, 38, 155, 198/158; 214/11 R

[56] References Cited
UNITED STATES PATENTS
3,615,001  10/1971  Temple............................198/20 R Primary Examiner—Edward A. Sroka
Attorney—Ralf H. Siegemund

[57] ABSTRACT

In a system for distributing pieces of load such as baggage, parcels etc., for example, among different destination points in an airport baggage handling system, using a closed loop conveyor system and loading and unloading stations, arranged along the loop. The conveyor system includes a plurality of individual carriages wherein some of the carriages have fixed level, load carrying platform, each followed directly by at least one carriage having liftable load carrying platform, forming therewith a group, whereby the number of carriages per group is equal to the number of loading stations; a first leading station is constructed for loading the fixed level carriages from a relatively low level, and the remaining loading stations are constructed for loading the liftable carriages when lifted to a higher level, selected for permitted passage of unlifted load carrying carriages. Each loading station includes a selectively operable loading belt, extending parallel to the direction of carriage movement at the respective loading station and being speed-synchronized with the carriages and at least one carriage per group is not loaded by any individual loading station.

7 Claims, 3 Drawing Figures

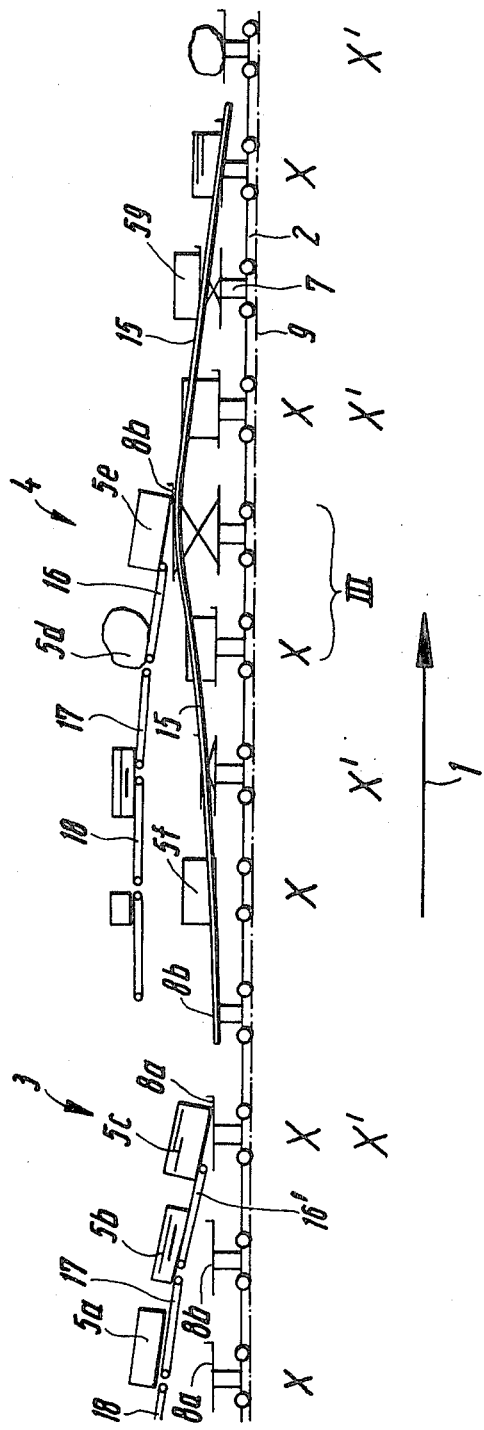

SYSTEM FOR DISTRIBUTING PIECES OF LOAD SUCH AS BAGGAGE, PARCELS ETC.

The present invention relates to a system for distributing pieces of load, such as baggage to a plurality of destination stations; the system includes several, more or less adjacently positioned stations for loading an empty conveyor train. More particularly, the invention relates to a baggage distribution system in airport terminals, and here particularly for distributing transit baggage to different gates and/or for separating transit baggage from baggage to be moved to a baggage claim area.

Conveyor belt systems are known wherein pushing devices are arranged along the belt for shifting selected items (e.g., selected suitcases) off the belt at a location regarded as the destination (or as leading specifically to the destination) of that item. Belt loading devices pushing load pieces onto the conveyor belt are likewise provided therealong. Plural such loading stations, even when closely positioned, are needed if the individual objects are to be encoded for identifying the respective destination, e.g., by a clerk; such encoding takes time. In order to accommodate high speed of operation for such a system as a whole, the conveyor system should be loaded by at least two loading stations, each of which can be operated intermittently for alternatingly loading the conveyor. On the other hand, conveyor belts and loading devices designed for the "average" pieces of baggage are not satisfactory, for example, in airport baggage handling facilities, having to accommodate and to process many different kinds of luggage and packages, some of them oddly shaped, others being fragile etc. Particularly, suitcases with a fine surface finish are readily scraped, when pushed at a high speed onto a high speed conveyor belt. Additionally, a sudden change in direction of movement for the suitcase from the direction of immediate pushing to the (transverse) direction of belt advance is hard on the luggage. For example, soft side suitcases, suit hangers, camping bags, totebags etc., may readily assume odd positions on the belt, making it difficult for a pusher to shift the item off the belt at the destination point. Also, such items may lodge themselves on the belt in such a position that they are damaged by a rapid action pushing device. Moreover, high speed conveyor belts or the like can work only along straight paths, otherwise centrifugal forces may become increasingly noticeable.

It is an object of the present invention to provide a baggage conveyor system, handling the baggage quite gently, still at high speed and without constraint on directional changes. Specifically, it is an object of the invention to provide for a conveyor system in closed loop configuration.

In accordance with the preferred embodiment of the invention, it is suggested to provide the conveyor facility as or with a circulating chain with inserted carriages. The carriages each are provided with a platform. Some of these platforms have particular invariable level, others can be raised from that level by a particular height. Each carriage with invariable or fixed level platform is followed by one or more carriages with liftable platforms, establishing therewith a particular group. Each group has, thus, a particular number of concatenated carriages and that grouping configuration is repeated along the entire conveyor train. The number of carriages per group as thus defined, is equal to the number of loading stations on the track.

Each loading station has a small conveyor belt running parallel to the main conveyor facility and above the same and intermittently at the same speed of the latter. The first loading station loads the fixed level platforms and from a relatively low level, just sufficiently above the conveyor train, so that all platforms in lowermost position, if empty can clear the low level loading belt of that station. The other loading stations load raised platforms, whereby these platforms as well as lowered ones carrying load, can pass underneath the loading facility proper of these stations.

The load bearing platforms are constructed to impede forward or rearward dropping off of pieces of load. As the conveyor facility runs in a closed loop, some portions of the track are curved so that the loads must also be protected against lateral drop off.

It should be noted that it is known per se to have a conveyor belt drop loads onto a conveyor facility underneath, and chains in conveyor systems are also known per se. However, the present invention relates to a system which accommodates slow initial loading from different points (such as intermittend check-in), to the high speed operation of a high speed conveyor operation. For this, at least two loading operations of the high speed conveyor train are carried out at different levels with more or less independent loading of different sets of platforms. This, in turn, permits the loading process proper to be carried out by causing the pieces of load to drop from a small height (about equal to the vertical dimension of a loading belt of the endless belt variety). The loading belt is speed-synchronized with the conveyor train during transfer of load. No pushing, impacting, sliding, sudden high level drops etc., are involved.

Some of the platforms are lifted up for loading. For this, a passive system is suggested in that by cam-follower-like action, guide rails for guide rolls on the platforms run the platform up and down again as the carriage for the respective platform passes through a loading station for elevated loading.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 shows a somewhat detailed side view of the system as indicated by III in FIG. 1.

Figure 1:
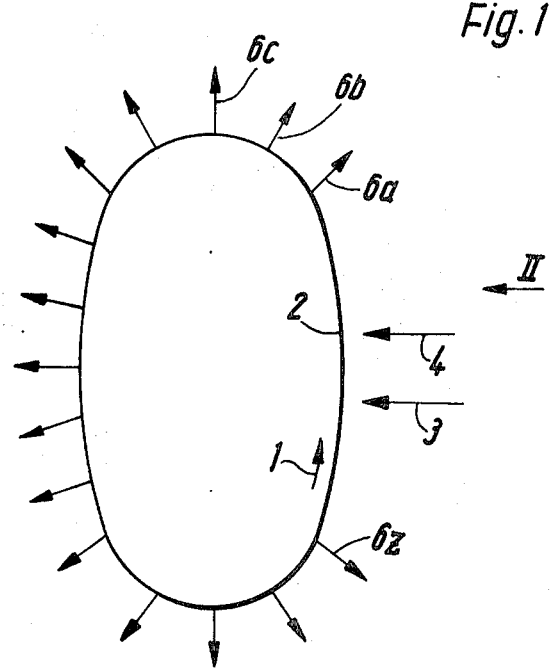
FIG. 1 is a schematic representation of a closed loop conveyor track to which the invention has been applied.

Proceeding now to the detailed description of the drawings, FIG. 1 illustrates somewhat schematically a closed loop conveyor system 2, travelling in direction of arrow 1. Arrows 3 and 4 denote symbolically loading stations, pertaining, for example, to the check-in facilities in an airport departure hall or they are located to receive baggage from an arriving flight to be distributed to baggage claim areas or gates for connecting flights. Individual pieces of luggage are received, encoded and deposited onto conveyor 2 by these loading stations.

Plural unloading stations are denoted by outgoing arrows 6a, 6b, . . . 6z. In accordance with its coding, a piece of luggage is removed from the conveyor 2 in one of them. Assuming that the system works properly, the stretch from the last destination, 6z, to loading station 3 is always empty and stations 3 and 4 load the conveyor alternatingly.

Figure 2:
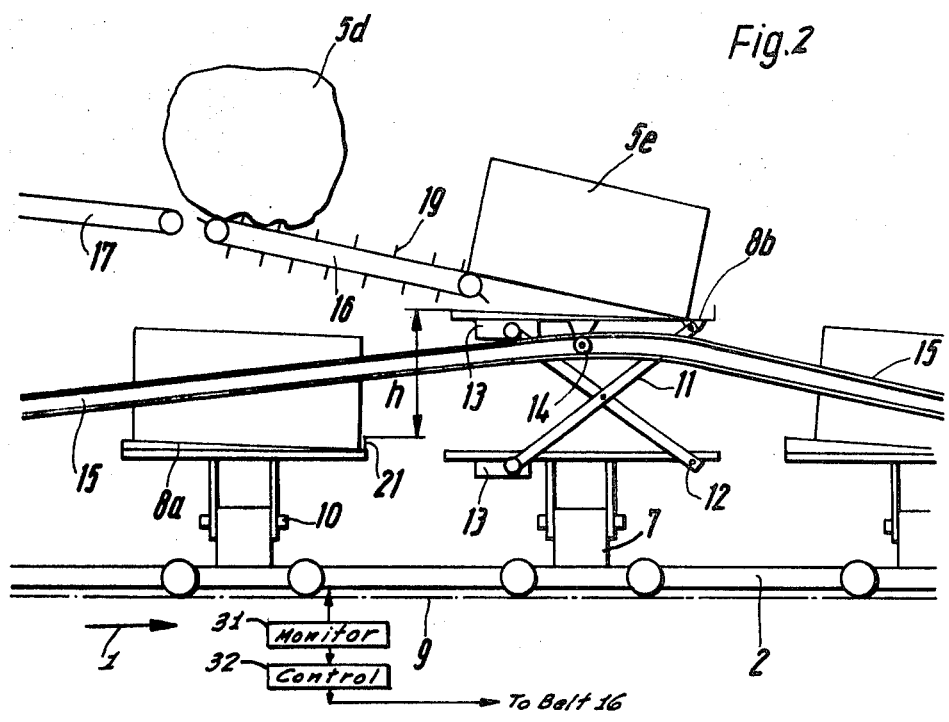
FIG. 2 shows side view of a loading station with platform lifting facility.

After having described the basic system, we proceed to FIG. 2, showing in greater detail that the conveyor facility 2 is constructed as a chain, having included regularly spaced carriages 7. The chain with carriages runs on a stationary track 9. Each carriage supports a platform such as 8a and 8b pivotally mounted to the respective carriage by means of pins 10. Each platform is, thus, tiltable, there being suitable power means provided for tilting a platform on an axis that extends parallel to the direction of conveyor motion. A platform is tilted for unloading at the respective destination (6 in FIG. 1), just sufficient so that the load slides gently off the platform, e.g., onto another conveyor facility, onto a platform truck or the like. Thereafter the platform tilts back, and the empty carriage with platform arrives shortly thereafter at the loading facility 3.

A platform such as 8a has a fixed level position on the respective carriage (except, of course, for the tilting). Several of the carriages behind one with fixed level platform, are provided with liftable platforms 8b. By means of a parallel lifting device 11, including scissor-like rods, platform 8b can be raised and lowered. The one rod on each side is pivoted such as shown at 12, the lower ends of the two rods have pivot pins which run in guide slots such as 13. When lowered, platforms 8b have the same level as platforms 8a.

The platforms 8b are being lifted by a passive system that includes profiled, ramp-like guide rails 15 in which run rolls 14, respectively journalled in the middle of opposite long sides of the liftable platforms. Another flight of rails 15 should be provided on the other side, there being corresponding rolls 14 on both long sides of the platforms, so that the lifting force is applied symmetrically upon the respective platforms 8b. The high point of a platform is defined by a gentle apex contour in rails 15 and defines a loading station such as 4.

The several platforms 8a and 8b each have a slight inclination with a flange or stop ridge 21 provided at the end. Thus, packages or the like dropped onto the platforms may not continue to slide or roll but will come to rest at the stop 21. The raised inclination towards the rear of a platform prevents an object from rolling (uphill) towards the rear. Both safety measures are important if the system stops for any reason and restarts.

As the conveyor system is to work in a closed loop configuration, some curving of the track is inevitable. The building layout may require in places fairly sharp curves. For this, the tracks may provide with some bank to offset centrifugal force. Also, the side edge of any platform on the inside of the curve should be provided with a ridge, as precaution in case the train stops for any reason.

Flights of endless conveyor belts 16 and 17 lead to the station, whereby belt 16 is particularly provided as loading belt for delivering objects to the point of loading and dropping it on a raised platform, when the platform is in highest position.

It can be seen that the height $h$ of lifting is determined as a level difference. The low level is given by the level of all platforms, when not lifted. The highest level is defined by the requirement to provide for just enough spacing underneath delivery and loading belt 16. On the other hand, the height $h$ should be chosen so that it is higher than the largest permissible width dimension of packages, suitcases etc. Examples of baggage are depicted and identified by 5e and 5d.

The loading belt 16 may additionally be provided with transverse ridges or ribs 19. They may be a few centimeters high, and they should be yielding (i.e., made of rubber or the like). Such ridges will prevent a package from rolling on the belt. A completely filled bag may well have the tendency to roll forward. Also, the loading belt should have smaller tilt than the others to prevent uncontrolled loading of the conveyor system.

As will be explained more fully below, the loading station may be provided with a monitor 31 responding, for example, accurately to the exact time of arrival of a carriage to be loaded at that station. The particular carriages may be marked, for example, so that the monitor responds to passage of these carriages only. Alternatively, the monitor 31 may be provided with a "countdown" facility skipping many carriages after having responded to one and before responding to the next one. The monitor will provide a control signal to a belt control device 32 setting the loading belt 16 into motion for the period of time it takes to roll-off the upwardly directed surface portion of the belt. As the belt 16 is to move at the same speed as train 2, the duration of belt movement should be about equal to the passage of the length of platform 8b under any given point, such as the point below the loading end of belt 16. In case the load piece spacing is longer, the belt 16 has to run somewhat longer. A feeler, for example, may be provided to stop belt 16 when the next piece of load has position just before the drop-off end of the belt. It is essential that for such a loading station there is a period of time in which it is not loading, it is this the period it takes carriages not to be loaded by that station to pass. These carriages are going to be or have been loaded in different stations.

After having described an individual loading station, the organization of the conveyor line will be explained with reference to FIG. 3.

In accordance with the rule above, the carriages with platform are arranged in groups, wherein the number of carriages per group is equal to the number of loading stations, and the first carriage of each group has a fixed level platform, the others have liftable platforms. Applying this rule to a system of two loading stations (such as 3 and 4), each group of carriages consists of two carriages, one with fixed level platform, the other one with liftable platform. Such a system is depicted in FIG. 3.

There are shown plural carriages with fixed level platform 8a, each being followed by one carriage with liftable platform 8b. The instantaneous positions of the carriages with fixed level platform 8a are identified by an $x$ which can also be interpreted as the beginning of a group of carriages. The $x$-pattern, of course, travels with the conveyor track.

The first loading station 3 is particularly identified by a loading belt 16' which has very low position, just high enough that all platforms, fixed level and liftable, but not lifted platforms, can pass. Loading station 4 has its loading belt 16 positioned as shown in FIG. 3, whereby the low end of loading belt 16 just clears a lifted platform. Also, any baggage or the like that has been disposed on the platforms 8a will clear the belt 16.

Belts 16 And 16' as well as the various feeder belts 17, 18 etc., are shown in the same plane as track 2 of the principle conveyor system. However, this is not necessarily the case. These various belts may be arranged on a curve or at right angle to each other, so that the respective first feeder belt for a station, 3 or 4, is loaded for initial transport in direction transverse to the plane of the that is towards the conveyor line 2 as depicted in FIG. 1 by arrows 3 and 4.

In operation, the conveyor line 2, i.e., the endless train of carriages 7 runs and circulates continuously at constant, relatively high speed. The carriages all pass station 3, with platform 8b in lowered position. A monitor such as 31 in FIG. 2 determines approach of a carriage with fixed level platform and sets loading belt 16' into motion. Previously, the load, such as 5c, was transported onto belt 16' and belt 16' had stopped. Now, as a carriage with fixed level platform approaches, monitor 31 operates the control for belt 16'. As the carriage passes below belt 16', the loading belt sets the item 5c onto platform 8a. Thereupon the control for belt 16' stops the belt.

However, as the belt 16' moved load piece 5c toward its end for depositing onto the platform, the rear end of belt 16' engaged the next item 5b. After piece 5c has dropped onto the platform, item 5b lodges on belt 16'. The belt stops until the monitor detects approach of the next carriage with fixed level platform.

The system is adjusted so that even for continuous operation the loading times of station 3 follow each other so that the several items (5a, 5b, 5c as shown) can be encoded, e.g., manually, to obtain destination coding for fully automated operation.

The liftable platforms 8b are loaded in station 4. Loading operation is the same as in station 3, except that it is carried out at a higher elevational level, while the already loaded platforms 8a pass underneath. It can be seen that both stations do not have to operate simultaneously, but both of them can operate for loading the platforms as they circulate in the system.

Therefor, a definition of terms is in order. Strictly speaking, in terms of time, the two stations as illustrated operate concurrently, just because the stations 3 and 4 are arranged on the conveyor track system so that an empty but lifted platform passes the unloading end of belt 16 just when an empty low level platform passes belt 16'. The time relation would be different if the two stations are just by one carriage-to-carriage spacing closer or farther apart. This depends entirely on convenience of overall layout. However, when we speak here of alternate loading, we mean the fact that each station loads only alternate carriages so that for each station the period of passage of the respective other type of carriage is available for encoding. The feeding systems 17, 18, etc., can be arranged so that, in fact, the initial depositing of baggage into stations 3 and 4 is carried out alternatingly in time, so that the arrival rate of baggage in both loading stations does not only match the departure rate of all that baggage, but the "phase" of operation is consistently maintained without causing any local back-up. Moreover, the conveyor system can be used completely with no (or only a few) carriages circulating empty.

It can also be seen that in case the stations are arranged as illustrated, the control can be simplified as a fixed level platform and a lifted platform is loaded simultaneously. Also, monitor 31, does not have to provide for a true detection operation, rather belts 16 and 16' may be operated intermittently at a fixed rate as long as the conveyor train 2 runs at constant speed. However, local control of start and stop of the feeder belts 16, 16', may be advisable for accurately timing the loading operation so as to offset temporary misalignment or "phase error" between any particular carriage and the others. A platform must have always exactly the predicted and necessary position when the respective loading belt starts to run for dropping the load; in a successful system any occasional "misses" cannot be tolerated.

FIG. 3 shows some additional symbols to demonstrate application of the general principle to situations of more than two loading stations. Assuming that there are three loading stations, such as denoted at A, B and C, the rule applied for that case requires each carriage with fixed level platform to be followed by two carriages with liftable platforms. Such a series of groups with three carriages per group is symbolically represented by x'. Again, the first loading station is the one for loading the fixed level platforms. The other loading stations must load raised platforms as the loaded platforms pass underneath. The second station (first one for elevated loading) has switches provided at the apex points for rails 15, and straight rails continue from there to the third loading station. All liftable platforms are raised at this second station, but only every second one is loaded and run down again. The respective interspaced lifted platforms continue beyond the switch toward station C' to be loaded there. The guide rail 15 will then lower all the platforms which are being loaded at station C. Alternatively, the different liftable platforms may run in different guide rail systems, one for lifting at B, the other one for lifting at C.

The invention is not limited to the embodiments described above but all changes and modifications thereof not constituting departures from the spirit and scope of the invention are intended to be included.

We claim:

1. In a system for distributing pieces of load such as baggage, parcels etc., for example, among different destination points in an airport baggage handling system, using a closed loop conveyor system and loading and unloading stations, arranged along the loop, the improvement comprising:

a plurality of individual carriages in the conveyor system, circulating therein and being interconnected for moving in unison, some of the carriages having fixed level load carrying platform, each carriage with a fixed level platform followed directly by at least one carriage having liftable load carrying platform, a carriage of the plurality with fixed level platform and the carriages with liftable platform that follow that carriage will fixed level platform constituting a group, the number of carriages per group being equal to the number of loading stations;

a first loading station of the plurality constructed for loading the fixed level carriages from a relatively low level;

the remaining loading stations of the plurality constructed for loading the liftable carriages when lifted to a higher level, selected for permitted passage of unlifted load carrying carriages;

each loading station including a selectively operable loading belt, extending parallel to the direction of carriage movement at the respective loading station and being speed synchronized with the carriages; means for operating a loading station of the plurality so that at least one carriage per group is not loaded by the loading station;

unloading stations being arranged on the line so that all carriages pass the first loading station with empty platforms.

2. In a system as in claim 1, wherein the platform on each carriage is slightly inclined in forward direction and having a flange in the front as stop for load thereon.

3. In a system as in claim 1, wherein the loading belts are inclined and provided with transverse ribs.

4. In a system as in claim 3, wherein the ribs are yieldingly resilient.

5. In a system as in claim 1, wherein the means for lifting are passive and include guide means on the liftable platforms and stationary guide rails leading up to and down behind a loading station of the remaining plurality, for raising and lowering a liftable platform as it respectively approaches and recedes from the station.

6. In a system as in claim 5, wherein the liftable platforms are mounted to the respective carriages by means of parallel lifting means.

7. In a system as in claim 6, wherein the liftable platforms are additionally mounted for tilting on an axis parallel to the direction of carriage movement.

* * * * *